United States Patent [19]
Miller et al.

[11] Patent Number: 6,093,352
[45] Date of Patent: Jul. 25, 2000

[54] PROCESS FOR PRODUCING FOAM BY MONITORING KEY PROCESS PARAMETERS

[75] Inventors: Larry M. Miller, Suffield; Raymond M. Breindel, Hartville; Mitchell Z. Weekley, Akron, all of Ohio

[73] Assignee: Owens Corning Fiberglas Technology, Inc., Summit, Ill.

[21] Appl. No.: 09/154,067

[22] Filed: Sep. 16, 1998

[51] Int. Cl.⁷ ............................... B29C 44/20; C08J 9/00
[52] U.S. Cl. .................... 264/50; 264/53; 264/DIG. 5; 521/79; 521/97; 521/146
[58] Field of Search ............... 264/50, DIG. 5, 264/53; 521/97, 79, 146

[56] References Cited

U.S. PATENT DOCUMENTS

| | | |
|---|---|---|
| 3,725,317 | 4/1973 | Rondon et al. ................... 521/79 |
| 4,176,144 | 11/1979 | Schwab . |
| 4,455,272 | 6/1984 | Schubert et al. ................ 264/53 |
| 4,636,527 | 1/1987 | Suh et al. . |
| 4,764,420 | 8/1988 | Gluck et al. . |
| 5,082,608 | 1/1992 | Karabedian et al. . |
| 5,110,524 | 5/1992 | Harclerode et al. . |
| 5,110,837 | 5/1992 | Harclerode et al. . |
| 5,130,340 | 7/1992 | Allen et al. ..................... 264/53 |
| 5,218,006 | 6/1993 | Reedy et al. . |
| 5,229,429 | 7/1993 | Hahn et al. . |
| 5,240,657 | 8/1993 | Harclerode et al. . |
| 5,244,927 | 9/1993 | Binder et al. . |
| 5,250,577 | 10/1993 | Welsh . |
| 5,258,415 | 11/1993 | Hahn et al. . |
| 5,269,987 | 12/1993 | Reedy et al. . |
| 5,288,740 | 2/1994 | Park et al. . |
| 5,302,624 | 4/1994 | Reedy et al. . |
| 5,332,761 | 7/1994 | Paquet et al. . |
| 5,342,560 | 8/1994 | Sturm et al. .................. 264/50 |
| 5,342,857 | 8/1994 | Reedy et al. . |
| 5,389,694 | 2/1995 | Vo et al. . |
| 5,422,378 | 6/1995 | Vo . |
| 5,426,125 | 6/1995 | Vo et al. . |
| 5,434,195 | 7/1995 | Imeokparia et al. . |
| 5,453,454 | 9/1995 | Alicke et al. . |
| 5,462,794 | 10/1995 | Lindemann et al. . |
| 5,464,881 | 11/1995 | Henn et al. . |
| 5,576,094 | 11/1996 | Callens et al. . |
| 5,595,694 | 1/1997 | Reedy et al. . |
| 5,693,687 | 12/1997 | Imeokparia et al. ............... 264/50 |
| 5,753,717 | 5/1998 | Sanyasi ....................... 264/45.8 |

FOREIGN PATENT DOCUMENTS

| | | |
|---|---|---|
| 0 291 179 | 11/1988 | European Pat. Off. . |
| 0 318 846 B1 | 6/1989 | European Pat. Off. . |
| 0 360 030 B1 | 3/1990 | European Pat. Off. . |
| 0 361 095 A1 | 4/1990 | European Pat. Off. . |
| 0 361 096 A1 | 4/1990 | European Pat. Off. . |
| 0 464 581 B1 | 1/1992 | European Pat. Off. . |
| 0 543 242 B1 | 5/1993 | European Pat. Off. . |
| 0 700 413 B1 | 3/1996 | European Pat. Off. . |
| 0 802 220 A2 | 10/1997 | European Pat. Off. . |
| 39 43 265 | 7/1991 | Germany ...................... 264/50 |
| WO 86/06084 | 10/1986 | WIPO . |
| WO 96/00258 | 4/1996 | WIPO . |
| WO 96/11970 | 4/1996 | WIPO . |
| WO 96/18672 | 6/1996 | WIPO . |
| WO 96/34038 | 10/1996 | WIPO . |

*Primary Examiner*—Allan R. Kuhns
*Attorney, Agent, or Firm*—Inger H. Eckert; Anthony R. Chi

[57] ABSTRACT

In one embodiment, the present invention relates to a process for preparing a foam product including the steps of (A) forming a foamable mixture of (1) an alkenyl aromatic polymer and (2) a blowing agent under a pressure sufficient to prevent prefoaming of the mixture and (B) foaming the mixture into a region of reduced pressure to form the foam product, wherein the difference between the glass transition temperature of the foamable mixture and the foaming temperature is less than about 62° C.

22 Claims, No Drawings

PROCESS FOR PRODUCING FOAM BY MONITORING KEY PROCESS PARAMETERS

FIELD OF THE INVENTION

The present invention generally relates to processes for preparing extruded foam products and more particularly to a processes for producing such products using alkenyl aromatic polymers with specifically defined glass transition and foaming temperatures.

BACKGROUND OF THE INVENTION

Extruded synthetic resinous foams are useful materials for many applications including thermal insulation, decorative purposes, packaging and the like. Thermal insulation is one particularly important application for styrene polymer foams. In this application, it is desirable to maintain the insulating value of the foam for as long as possible. It is also desirable for the foam to have dimensional stability. The desirable characteristics can be achieved, in part, by providing foams having uniform cell size.

The general procedure utilized in the preparation of extruded synthetic resinous foam bodies generally involves the following steps. A resin, such as a polystyrene resin, is heat plastified and one or more fluid blowing agents is incorporated and thoroughly mixed into the plastified resin under conditions which permit thorough mixing of the blowing agent into the plastified resin and prevent foaming of the mixture. The mixture of resin, blowing agent and optional additives is cooled, and the pressure on the mixture is reduced resulting in foaming of the mixture and formation of the desired foam body. In other words, foam bodies are obtained by extruding the cooled plastified mixture of resin, blowing agent and optional additives into a region of lower pressure.

There nevertheless remains a need for foam products having improved insulating values, improved dimensional stability, and more uniform cell size.

SUMMARY OF THE INVENTION

The present invention relates to polymer foams which are the so-called "extruded foams". The extruded foams have fairly uniform, relatively small average cell size and are thus particularly useful for thermal insulation. The extruded foams also have a relatively low density and thus are even more particularly useful for thermal insulation. Another aspect of the extruded foams is that they possess a high level of dimensional stability. The improved properties of the foam according to the invention are attributable, in part, to monitoring and setting certain processing parameters. Finally, although the extruded foams can be made with blowing agents such as CFCs, HCFCs, HFCs and soft CFCs, the extruded foams can be made without halogen containing blowing agents.

In one embodiment, the present invention relates to a process for preparing a foam product including the steps of (A) forming a foamable mixture of (1) an alkenyl aromatic polymer and (2) a blowing agent under a pressure sufficient to prevent prefoaming of the mixture and (B) foaming the mixture into a region of reduced pressure to form the foam product, wherein the difference between the glass transition temperature of the foamable mixture and the foaming temperature is less than about 62° C.

In another embodiment, the present invention relates to a process for preparing a foam product including the steps of (A) forming a foamable mixture of (1) an alkenyl aromatic polymer and (2) a blowing agent comprising a major amount of carbon dioxide under a pressure sufficient to prevent prefoaming of the mixture, with the proviso that the blowing agent does not contain a halogen blowing agent, and (B) foaming the mixture into a region of reduced pressure to form the foam product, wherein the difference between the glass transition temperature of the foamable mixture and the foaming temperature is less than about 62° C.

In yet another embodiment, the present invention relates to a process of preparing a foam product including the steps of (A) forming a foamable mixture of (1) an alkenyl aromatic polymer and (2) a blowing agent containing a major amount of carbon dioxide under a pressure sufficient to prevent prefoaming of the mixture and (B) foaming the mixture into a region of reduced pressure and at a foaming temperature of less than about 125° C. to form the foam product, wherein the difference of glass transition temperature of the foamable mixture and the foaming temperature is less than about 63° C.

DESCRIPTION OF PREFERRED EMBODIMENTS

The foamable mixtures which are extruded and foamed in accordance with the inventive process contain an alkenyl aromatic polymer and a blowing agent. The foamable mixtures may contain other optional additives. In one embodiment, the alkenyl aromatic polymer is either a copolymer of styrene and at least one meta-substituted styrene or para-substituted styrene or a mixture of a styrenic polymer having a high melt index and a styrenic polymer having a low melt index. Each of the styrenic polymers may be a polymer of styrene or a copolymer of styrene and at least one copolymerizable monomer. The alkenyl aromatic polymer may be copolymerized with other additional monomers.

The foamable mixtures which are extruded and foamed in accordance with the process of the present invention contain an alkenyl aromatic polymer. In one embodiment, the alkenyl aromatic polymer is any polymer containing monomers of at least one of styrene and substituted styrenes.

In another embodiment, the alkenyl aromatic polymer contains at least 50% of a styrene monomer (% number of monomers of total number of monomers in the copolymer). A styrene monomer is an aromatic compound with an alkenyl group characterized by Formula (I):

$$Ar\text{---}CH\text{=}CH_2 \qquad (I)$$

wherein Ar represents an aromatic hydrocarbon group of the benzene series. In one embodiment, the alkenyl aromatic polymer contains from about 0% to about 95% (% number of monomers of total number of monomers in the copolymer) of a styrene monomer. In another embodiment, the alkenyl aromatic polymer contains from about 20% to about 90% of a styrene monomer. In yet another embodiment, the alkenyl aromatic polymer contains from about 30% to about 85% of a styrene monomer.

In another embodiment, the foamable mixtures which are extruded and foamed in accordance with the process of the present invention contain an alkenyl aromatic polymer that contains monomers of at least one meta-substituted styrene or para-substituted styrene. The meta-substituted styrene or para-substituted styrene monomer is an aromatic compound of Formula (II) any may be represented by the following formula

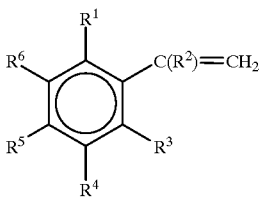

(II)

wherein $R^1$, $R^3$, $R^4$, $R^5$ and $R^6$ are each independently hydrogen, chlorine, bromine, or alkyl groups containing from 1 to about 8 carbon atoms, but at least one of $R^4$, $R^5$ and $R^6$ is an alkyl group containing from 1 to about 8 carbon atoms, and $R^2$ is hydrogen or methyl, with the proviso that a total number of carbon atoms in the monomer does not exceed 20. In a preferred embodiment, at least one of $R^4$, $R^5$ and $R^6$ is an alkyl group containing from 1 to about 4 carbon atoms, such as a methyl group, ethyl group, propyl group, isopropyl group or butyl group. In a more preferred embodiment, only one of $R^4$, $R^5$ and $R^6$ is an alkyl group containing from 1 to about 4 carbon atoms and the other two of $R^4$, $R^5$ and $R^6$ are hydrogen.

In one embodiment, the alkenyl aromatic polymer contains from about 0% to about 100% of a meta-substituted styrene or para-substituted styrene monomer. In another embodiment, the alkenyl aromatic polymer contains from about 10% to about 95% of a meta-substituted styrene or para-substituted styrene monomer. In yet another embodiment, the alkenyl aromatic polymer contains from about 20% to about 80% of a meta-substituted styrene or para-substituted styrene monomer.

Examples of such meta-substituted styrene or para-substituted styrene monomers include 3-methyl styrene, 4-methyl styrene, 2,4-dimethyl styrene, 2,5-dimethyl styrene, 4-chlorostyrene, 3-chlorostyrene, 4-chloromethyl styrene, 3-chloromethyl styrene, 4-bromostyrene, 3-bromostyrene, etc.

The alkenyl aromatic polymer may be a homopolymer or a copolymer of any of the styrene monomers and any of the meta-substituted styrene or para-substituted styrene monomers described above. The alkenyl aromatic copolymers may contain additional monomers or copolymers. The alkenyl aromatic polymer may be a blend of any of the homopolymers and/or copolymers and/or any other additional polymers.

The alkenyl aromatic polymer and monomers thereof are commercially available in a variety of molecular weights. The molecular weights of such polymers can be determined by several methods well known to those skilled in the art, such as intrinsic viscosity, light scattering, and ultracentrifuge sedimentation. The alkenyl aromatic polymers useful in the foamable mixtures generally have weight average molecular weights from about 30,000 to about 500,000. In another embodiment, the alkenyl aromatic polymers have weight average molecular weights from about 100,000 to about 450,000. In yet another embodiment, the alkenyl aromatic polymers have weight average molecular weights from about 150,000 to about 400,000.

The flow rate of a melted polymer through an orifice, sometimes described as melt flow index (MFI) or melt index, may be used to compare molecular weight relationships or can be used as a characteristic parameter itself. MFI is a low cost, easily performed technique. Details may be found in a number of publications, such as *Principles of Polymer Chemistry*, by P. J. Flory, Cornell University Press, Ithaca, N.Y., 1953. In one embodiment, the alkenyl aromatic copolymers have a melt flow index from about 2 to about 13. In another embodiment, the alkenyl aromatic polymers have a melt flow index from about 3 to about 12. In yet another embodiment, the alkenyl aromatic copolymers of have a melt flow index from about 4 to about 10. In still yet another embodiment, the alkenyl aromatic copolymers have a melt flow index from about 4 to about 8. MFI can be determined, for example, in accordance with ISO 1133:1997(E) ($3^{rd}$ Edition).

In one embodiment, the one or more additional monomers preferably contain at least one ethylenically unsaturated group which is copolymerizable with the alkenyl aromatic polymer. Examples include one or more monomers of acrylonitrile, phenylene ethers, vinyl chloride, vinylidene chloride, olefins such as ethylene, propylene and copolymers thereof, butadiene, maleic anhydride, citraconic anhydride, itaconic anhydride, vinyl acetate, vinyl toluene, and acrylates such as methacrylate, methyl methacrylate, ethyl acrylate, etc. Mixtures of such resins may be prepared and foamed in accordance with the process of the invention. In one embodiment, the amount of copolymerizable monomer in the alkenyl aromatic polymers is from about 0.1% to about 10%, and preferably from about 1% to about 5%.

In another embodiment, the foamable mixtures which are extruded and foamed in accordance with the inventive process contain two different styrenic polymers. One styrenic polymer has a high melt index and is a polymer of styrene or a copolymer of styrene and at least one copolymerizable monomer. The other styrenic polymer has a low melt index and is a polymer of styrene or a copolymer of styrene and at least one copolymerizable monomer. Either or both of the two styrenic polymers may be further copolymerized with other monomers. A copolymerizable monomer is any monomer that can be polymerized with styrene monomers to form a styrene copolymer. Generally speaking, the copolymerizable monomer is a monomer containing an ethylenically unsaturated group.

In a preferred embodiment, the copolymerizable monomer containing an ethylenically unsaturated group is an aromatic compound of Formula (III) any may be represented by the following formula

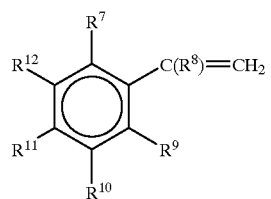

(III)

wherein $R^7$, $R^9$, $R^{10}$, $R^{11}$ and $R^{12}$ are each independently hydrogen, chlorine, bromine, or alkyl groups containing from 1 to about 8 carbon atoms, and $R^8$ is hydrogen or methyl, with the proviso that a total number of carbon atoms in the monomer does not exceed 20. In a preferred embodiment, at least one of $R^{10}$, $R^{11}$ and $R^{12}$ is an alkyl group containing from 1 to about 8 carbon atoms. In another embodiment, at least one of $R^{10}$, $R^{11}$ and $R^{12}$ is an alkyl group containing from 1 to about 4 carbon atoms, such as a methyl group, ethyl group, propyl group, isopropyl group or butyl group. In a preferred embodiment, only one of $R^{10}$, $R^{11}$ and $R^{12}$ is an alkyl group containing from 1 to about 4 carbon atoms and the other two of $R^{10}$, $R^{11}$ and $R^{12}$ are hydrogen.

Examples of copolymerizable monomers according to Formula (III) include 3-methyl styrene, 4-methyl styrene, 2,4-dimethyl styrene, 2,5-dimethyl styrene, 4-chlorostyrene, 3-chlorostyrene, 4-chloromethyl styrene, 3-chloromethyl styrene, 4-bromostyrene, 3-bromostyrene, alpha-methyl styrene, alpha-2-dimethyl styrene, etc. In one embodiment, the copolymerizable monomer is a meta-substituted styrene or para-substituted styrene. In another embodiment, the copolymerizable monomer is a meta-alkyl group substituted styrene or para-alkyl group substituted styrene, wherein the alkyl group contains 1 to about 4 carbon atoms.

In another embodiment, the copolymerizable monomer containing an ethylenically unsaturated group is one or more monomers of acrylonitrile, phenylene ethers, vinyl chloride, vinylidene chloride, olefins such as ethylene, propylene and copolymers thereof, butadiene, maleic anhydride, citraconic anhydride, itaconic anhydride, vinyl acetate, vinyl toluene, and acrylates such as methacrylate, methyl methacrylate, ethyl acrylate, etc.

In this embodiment, the alkenyl aromatic polymer of the foamable mixture contains a major amount of a styrenic polymer having a high melt index and a mirror amount of a styrenic polymer having a low melt index. A major amount means that the foamable mixtures contain at least 50% by weight of a styrenic polymer having a high melt index. A minor amount means that the foamable mixtures contain less than 50% by weight of a styrenic polymer having a low melt index. In one embodiment, foamable mixtures contain from 50 to about 75% by weight of a styrenic polymer having a high melt index and from about 10 to about 40% of a styrenic polymer having a low melt index. In another embodiment, foamable mixtures contain from about 55 to about 70% by weight of a styrenic polymer having a high melt index and from about 15 to about 35% of a styrenic polymer having a low melt index. In one embodiment, the weight ratio of a styrenic polymer having a high melt index to a styrenic polymer having a low melt index is about 95:5 to about 55:45 (by weight). In another embodiment, the weight ratio of a styrenic polymer having a high melt index to a styrenic polymer having a low melt index is about 80:20 to about 60:40.

In one embodiment, styrenic polymers having a high melt index have a melt index from about 10 to about 35. In another embodiment, styrenic polymers having a high melt index have a melt index from about 15 to about 30. In a preferred embodiment, styrenic polymers having a high melt index have a melt index from about 17.5 to about 25. In one embodiment, styrenic polymers having a low melt index have a melt index from about 0.5 to about 5. In another embodiment, styrenic polymers having a low melt index have a melt index from about 0.75 to about 4. In a preferred embodiment, styrenic polymers having a low melt index have a melt index from about 1 to about 3.

The two styrenic polymers generally have different molecular weights. In one embodiment, styrenic polymers having a low melt index have weight average molecular weights from about 175,000 to about 500,000. In another embodiment, styrenic polymers having a low melt index have weight average molecular weights from about 200,000 to about 450,000. In yet another embodiment, styrenic polymers having a low melt index have weight average molecular weights from about 225,000 to about 400,000. In one embodiment, styrenic polymers having a high melt index have weight average molecular weights from about 30,000 to about 150,000. In another embodiment, styrenic polymers having a high melt index have weight average molecular weights from about 40,000 to about 125,000. In yet another embodiment, styrenic polymers having a high melt index have weight average molecular weights from about 50,000 to about 100,000.

In one embodiment, the styrenic polymer having a low melt index contains styrene monomers and from about 10% to about 99% of a meta-substituted styrene or para-substituted styrene monomers. In a preferred embodiment, the styrenic polymer having a low melt index contains styrene monomers and from about 15% to about 80% of a meta-substituted styrene or para-substituted styrene monomers. In a more preferred embodiment, the styrenic polymer having a low melt index contains styrene monomers and from about 20% to about 60% of a meta-substituted styrene or para-substituted styrene monomers.

In another embodiment, the styrenic polymer having a high melt index contains from about 55% to about 95% of a styrene monomers. In preferred embodiment, the styrenic polymer having a high melt index contains from about 65% to about 90% of a styrene monomer. In preferred embodiment, the styrenic polymer having a high melt index contains from about 70% to about 85% of a styrene monomer.

In one embodiment, the melt index of the styrenic polymers and the properties of the extruded, expanded foamed products obtained by the process of the present invention can be controlled and modified by the selection of the molecular weight of the resins. For example, the preparation of higher density foam polystyrene bodies is facilitated by decreasing the melt index of a styrenic polymer by using higher molecular weight resins whereas the preparation of lower density foam bodies is facilitated by increasing the melt index of a styrenic polymer by using lower molecular weight or higher viscosity resins.

In yet another embodiment, the melt index of the styrenic polymers and the properties of the extruded, expanded foamed products obtained by the process of the present invention can be controlled and modified by the relative amount of additional optional monomers used. In this connection, the styrenic polymers may further contain one or more monomers. In a preferred embodiment, the styrenic polymers further contain one or more monomers so long as the polymer has a desirable melt flow index (such as either of those described above).

Useful alkenyl aromatic polymers and monomers thereof are available commercially from a variety of sources and the resins are available with different properties such as melt flow index, molecular weight and so on. For example, various materials are available from ARCO Chemical Company under the general designation "DYLENE", for example DYLENE D-8; from Polysar Ltd., Sarnia, Ontario; from Chevron Chemical Co., for example EB-3100; and from Deltech Corp., of Whippany, N.J.

In one embodiment, the amount of the blowing agent added to the foamable mixture is from about 1% to about 16% by weight based on the weight of the alkenyl aromatic polymer. In another embodiment, the amount of the blowing agent added to the foamable mixture is from about 2% to about 15% by weight based on the weight of the alkenyl aromatic polymer. In yet another embodiment, the amount of the blowing agent added to the foamable mixture is from about 3% to about 10% by weight based on the weight of the alkenyl aromatic polymer. In a preferred embodiment, the amount of the blowing agent added to the foamable mixture is from about 4% to about 8% by weight based on the weight of the alkenyl aromatic polymer. Variations in the amount of blowing agent incorporated into the foamable mixture may be utilized, depending in part on the components of the blowing agent mixtures, to prepare extruded foamed bodies having different desirable characteristics.

In one embodiment, the blowing agent contains a major amount of carbon dioxide. A major amount of carbon dioxide means that the blowing agent contains more than 50% by weight carbon dioxide. In one embodiment, the blowing agent contains more than about 60% carbon dioxide, and particularly from about 65% to about 100% of carbon dioxide. In another embodiment, the blowing agent contains from about 70% to about 90% of carbon dioxide. In yet another embodiment, the blowing agent may be about 100% of carbon dioxide.

The blowing agent may be a mixture of carbon dioxide and at least one lower alcohol. A lower alcohol is an alkyl alcohol containing from 1 to about 4 carbon atoms. Lower alcohols include methanol, ethanol, propanol, isopropanol and butanol. The above carbon dioxide and blowing agent mixtures may also be used with additional, optional and supplemental blowing agents, most notably air, nitrogen and water as described below.

Particularly useful mixtures of blowing agents include mixtures comprising: 51–90% of carbon dioxide and 10–49% of ethanol; 60–80% of carbon dioxide and 20–40% of ethanol; 51–90% of carbon dioxide and 10–49% of methanol; 60–80% of carbon dioxide and 20–40% of methanol; 51–90% of carbon dioxide and 10–49% of water; and 60–80% of carbon dioxide and 20–40% of water. The optional use of a lower alcohol in combination with carbon dioxide provides extruded expanded foam bodies having larger cell sizes (from about 1% to about 25% larger in size) when compared to similar density products or bodies produced with carbon dioxide without a lower alcohol. Additionally, the blowing agent blends including carbon dioxide may contribute to extruded expanded foam products having improved compressive strengths at comparable densities. Extruded expanded foam products of acceptable characteristics are obtained utilizing the above blowing agent and blowing agent mixtures, and there is no necessity to use halo-carbon blowing agents.

In one embodiment, the blowing agent is one or more halogen blowing agents. In another embodiment, the blowing agent is a mixture of one or more halogen blowing agents and one or more of carbon dioxide, lower alcohols, air, nitrogen and water. Halogen blowing agents include halo-carbons such as chlorofluorocarbons, fluorocarbons, soft chlorofluorocarbons, fluorohydrocarbons, and chlorofluorohydrocarbons (typically of methane and ethane). Specific examples of halogen blowing agents include methylchloride, ethylchloride, chlorotrifluoromethane, dichlorodifluoromethane, 1,2,2-trifluoro-1,1,2-trichloroethane, chlorodifluoromethane, 1,1-dichloro-2,2,2-trifluoroethane, 1-chloro-1,1-difluoroethane, 1,1,1,2-tetrafluoroethane and 1,1-di-chloro-1-fluoroethane among others. In a preferred embodiment, the blowing agent is free of halogen blowing agents. Since halogen blowing agents can be harmful to the environment, their use is not desirable.

The blowing agent including blowing agent mixtures utilized in the process may be added to the foamable mixtures in any conventional manner. The blowing agent can be incorporated into the foamable mixture (combined with the alkenyl aromatic polymer) before, during or after polymerization. In one embodiment, the blowing agent may be directly injected into the foamable mixture in a heat plastifying and mixing apparatus such as an extruder. When more than one blowing agent is to be utilized, each of the blowing agents may be separately injected into the heat plastifying and mixing apparatus.

In addition to the alkenyl aromatic polymer and blowing agent, the foamable mixtures may contain, and generally do contain other additives which are included to modify certain characteristics and or properties of the foamable mixtures or the resultant foam bodies. For example, nucleating agents may be included to further reduce the primary cell size. Suitable nucleating agents include talc, calcium silicate, calcium stearate, calcium carbonate, clay, silica, titanium oxide, barium sulfate, diatomaceous earth, indigo, etc. In one embodiment, from about 0.01 to about 2 parts of nucleating agent per 100 parts of the alkenyl aromatic polymer are incorporated into the foamable mixture. In a preferred embodiment, from about 0.05 to about 1 part of nucleating agent per 100 parts of the alkenyl aromatic polymer is incorporated into the foamable mixture.

Plasticizers may also be added to the foamable mixture to facilitate processing of the foamable mixture in an extruder. In a preferred embodiment, the plasticizer is a low molecular weight resin (molecular weight below about 20,000). Examples of plasticizers include liquid paraffin or white oil, hydrogenated coconut oil, esters of $C_4$–$C_{20}$ monoalcohols, diols glycerine with higher fatty acids, styrene resin, vinyl toluene resin, alpha-methylstyrene resin, lower alcohols (containing 1 to about 4 carbon atoms), etc. In one embodiment, from about 0.1 to about 20 parts of plasticizer per 100 parts of the alkenyl aromatic polymer is incorporated into the foamable mixture. In a preferred embodiment, from about 1 to about 15 parts of plasticizer per 100 parts of the alkenyl aromatic polymer are incorporated into the foamable mixture.

Elastomeric rubbers may also be added to the foamable mixture to facilitate processing of the foamable mixture in an extruder and to enhance relaxation of the resultant foam bodies. In a preferred embodiment, the elastomeric rubber is a soluble in an alkenyl aromatic polymer. Examples of elastomeric rubbers include styrenic rubber, Kraton® (styrene-ethylene/butylene-styrene block copolymer), styrene-butadiene copolymer rubbers, acrylonitrile-butuadiene-styrene copolymer rubbers, etc. In one embodiment, from about 0.1 to about 10 parts of elastomeric rubber per 100 parts of the alkenyl aromatic polymer is incorporated into the foamable mixture. In a preferred embodiment, from about 0.5 to about 5 parts of elastomeric rubber per 100 parts of the alkenyl aromatic polymer are incorporated into the foamable mixture.

Flame-retardant chemicals may also be added to the foamable mixture to impart flame retardant characteristics to the resulting foamed bodies. Flame-retardant chemicals include brominated aliphatic compounds such as hexabromocyclododecane and pentabromocyclohexane, brominated phenyl ethers, esters of tatrabromophthalic acid, and combinations thereof. In one embodiment, from about 0.1 to about 5 parts of flame-retardant chemicals per 100 parts of the alkenyl aromatic polymer is incorporated into the foamable mixture. In a preferred embodiment, from about 0.5 to about 3 parts of flame-retardant chemicals per 100 parts of the alkenyl aromatic polymer are incorporated into the foamable mixture.

Other useful additives include stabilizers, pigments, extrusion aids, antioxidants, fillers, antistatic agents, UV absorbers, etc. These other additives can be included at any amount to obtain the desired characteristics in the foamable mixtures or resultant foamed bodies. The optional additives can be incorporated into the foamable mixture (combined with the alkenyl aromatic polymer and blowing agent) before, during or after polymerization.

Generally speaking, the components of the foamable mixture are combined and mixed, followed and/or accompanied by heating to a first temperature under a first pressure to form a plastified foamable mixture. From the extruder, the plastified foamable mixture is cooled to a second temperature (generally referred to as die melt temperature) and extruded into a region of reduced pressure to form a foam product. However, any process for making foams from the foamable mixtures according to the invention may be employed.

The first temperature must be sufficient to plastify or melt the mixture. In one embodiment, the first temperature is from about 135° C. to about 240° C. (below about 240° C.). In another embodiment, the first temperature is from about 145° C. to about 210° C. (below about 210° C.). In a preferred embodiment, the first temperature is from about 150° C. to about 165° C. (below about 165° C.). The first temperature is typically the glass transition temperature of the foamable mixture.

In one embodiment, the second temperature or die melt temperature is from about 140° C. to about 105° C. (below about 140° C.). In another embodiment, the second temperature or die melt temperature is from about 130° C. to about 110° C. (below about 130° C.). In a preferred embodiment, the second temperature or die melt temperature is from about 125° C. to about 115° C. (below about 125° C. and even below about 122° C.). The second temperature or die melt temperature is typically the foaming temperature.

The first pressure must be sufficient to prevent the foamable mixture containing the blowing agent from prefoaming. Prefoaming involves the undesirable premature foaming of the foamable mixture before it reaches the region of reduced pressure (foaming of the foamable mixture before foaming is desired). Accordingly, the first pressure varies depending upon the identity and amount of blowing agent in the foamable mixture. In one embodiment, the first pressure is from about 700 pounds per square inch absolute (psia) to about 4500 psia. In another embodiment, the first pressure is from about 840 psia to about 4000 psia. In a preferred embodiment, the first pressure is from about 1150 psia to about 3500 psia. The second pressure is sufficient to induce conversion of the foamable mixture into a foam body. In one embodiment, the second pressure is from about 0 psia to about 28 psia. In another embodiment, the second pressure is from about 1.4 psia to about 21 psia. In a preferred embodiment, the second pressure is from about 2.8 psia to about 15 psia.

In order to provide a foam body with sufficient dimensional stability so that it is not likely to collapse, it is required to monitor $\Delta T_g$. $\Delta T_g$ may be determined using the following equation:

$$\Delta T_g = T_g - T_f$$

wherein $T_f$ is the temperature at which the foamable mixture is foamed and $T_g$ is the glass transition temperature of the foamable mixture. The glass transition temperature is the temperature at which the foamable mixture changes from a brittle, vitreous state to a plastic state, or vice versa. The glass transition temperature of a polymer is typically lowered by introduction of a blowing agent.

In one embodiment, $\Delta T_g$ is less than about 63° C. In another embodiment, $\Delta T_g$ is less than about 62° C. In yet another embodiment, $\Delta T_g$ is less than about 60° C. In still yet another embodiment, $\Delta T_g$ is less than about 55° C. In a preferred embodiment, $\Delta T_g$ is less than about 50° C. Although not critical to the invention, in one embodiment, $\Delta T_g$ is greater than about 40° C.

The foam bodies (foam products including foam boards, foam sheets, foam insulation and other foam structures) prepared in accordance with the invention are characterized generally as having the following characteristics.

The resultant foam bodies generally have a relatively low density, typically less than about 3 lbs/ft³. Density can be determined, for example, in accordance with ASTM D1622-88. In one embodiment, the foam bodies have a density from about 0.1 to about 3 lbs/ft³. In another embodiment, the foam bodies have a density from about 0.5 to about 2.75 lbs/ft³. In a preferred embodiment, the foam bodies have a density from about 1 to about 2.6 lbs/ft³. In a more preferred embodiment, the foam bodies have a density from about 1.5 to about 2.5 lbs/ft³.

The resultant foam bodies generally have a relatively small average cell size, typically less than about 0.4 mm. Average cell size can be determined, for example, according to ASTM D3576-77. In one embodiment, the foam bodies have an average cell size from about 0.01 to about 0.4 mm. In another embodiment, the foam bodies have an average cell size from about 0.05 to about 0.35 mm. In a preferred embodiment, the foam bodies have an average cell size from about 0.1 to about 0.3 mm. In a more preferred embodiment, the foam bodies have an average cell size from about 0.15 to about 0.25 mm.

The resultant foam bodies generally have a relatively uniform average cell size, typically more than about 50% of the cells have a size within about 0.06 mm of the average cell size. In one embodiment, more than about 60% of the cells have a size within about 0.06 mm of the average cell size. In another embodiment, more than about 50% of the cells have a size within about 0.05 mm of the average cell size. In yet another embodiment, more than about 50% of the cells have a size within about 0.045 mm of the average cell size.

The resultant foam bodies generally contain a major amount of closed cells and a minor amount of open cells. The relative amount of closed cells can be determined, for example, according to ASTM D2856-A. In one embodiment, more than about 70% of the cells of the resultant foam bodies are closed cells. In another embodiment, more than about 80% of the cells of the resultant foam bodies are closed cells. In a preferred embodiment, more than about 90% of the cells of the resultant foam bodies are closed cells. In a more preferred embodiment, more than about 95% of the cells of the resultant foam bodies are closed cells.

In one embodiment, the resultant foam bodies made in accordance with the present invention have dimensional stability in any direction of about 5% or less. In another embodiment, the resultant foam bodies made in accordance with the present invention have dimensional stability in any direction of about 4% or less. In a preferred embodiment, the resultant foam bodies made in accordance with the present invention have dimensional stability in any direction of about 3% or less. In a more preferred embodiment, the resultant foam bodies made in accordance with the present invention have dimensional stability in any direction of about 2% or less.

Dimensional stability testing is according to ASTM D-2126/C578. The dimensions of specimens are approximately 4 inches by 4 inches by 1 inch. The samples are conditioned at least overnight. The dimension of the principal axis (vertical, horizontal and extrusion) of the specimens are taken to the nearest ±0.1%. The samples are exposed to a temperature of 70° C.±2° at a relative humidity of 97%±3% for a period of seven days. After cooling at room temperature for two hours. The dimensions of the three principal axis (vertical, horizontal and extrusion) of the specimens are taken to the nearest ±0.1%. The percentage dimensional change in each of the three principal axis, positive or negative (absolute value) is then determined to the nearest 0.1%. The industry standard for dimensional stability of preformed, cellular polystyrene thermal insulation as designated by ASTM C-578-87A is a 2% or less change in any direction.

The following examples illustrate the process of the present invention and the foam bodies obtained thereby. The general procedure and the apparatus utilized in the following examples, unless otherwise indicated, is as follows. A plastified resin mixture of the alkenyl aromatic polymer, nucleating agent and flame-retardant is prepared, and a blowing agent is incorporated into the plastified resin mixture to form a foamable mixture. In a preferred embodiment, a nucleation agent and a fire-retardant material are incorporated into the foamable mixture.

The foamed boards which are recovered in accordance with the process of the present invention are evaluated for density, average cell size, compressive strength, etc., by techniques known in the art. The average cell size is an average of the cell sizes as determined in the X, Y and Z directions. The "X" direction is the direction of extrusion; the "Y" direction is the cross machine direction; and the "Z" direction is the thickness. The compressive strength of the foam bodies of the present invention are determined utilizing ASTM Test C165-83 entitled "Measuring Compressive Properties of Thermal Insulation".

The remaining details of the process and of the apparatus with respect to the specific examples are contained in the description of the examples.

EXAMPLE 1

A blend of 80% of the low molecular weight resin, 20% of the high molecular weight mean resin, along with a nucleator, flame retardant and Kraton® were fed to a twin screw extruder having a screw diameter of 132 mm. The solids were melted then mixed with 3.0 wt % carbon dioxide and 2.1 wt % ethanol. The mixture was then cooled to an appropriate temperature, 116° F., for foaming to occur and foamed through a die opening of 27 cm wide and 0.8 mm high. The resulting foam had a density of 3.18 #/cuft, an average cell size of 0.223 mm, a thickness of 1.575 in and a width of 30.1 in. The difference of the foaming temperature and the glass transition temperature of the mixture of polymer and blowing agents in this case was 59.3° C. The resulting foam structure did not collapse.

EXAMPLE 2

A blend of 80% of the low molecular weight resin, 20% of the high molecular weight mean resin, along with a nucleator, flame retardant and Kraton® were fed to a twin screw extruder having a screw diameter of 132 mm. The solids were melted then mixed with 3.0 wt % carbon dioxide and 1.9 wt % ethanol. The mixture was then cooled to an appropriate temperature, 116° F., for foaming to occur and foamed through a die opening of 27 cm wide and 0.8 mm high. The resulting foam had a density of 3.27 #/cuft, an average cell size of 0.259 mm, a thickness of 1.638 in and a width of 27.625 in. The difference of the foaming temperature and the glass transition temperature of the mixture of polymer and blowing agents in this case was 54.9° C. The resulting foam structure did not collapse.

Comparative Example 1

A blend of 80% of the low molecular weight resin, 20% of the high molecular weight mean resin, along with a nucleator, flame retardant and Kraton® were fed to a twin screw extruder having a screw diameter of 132 mm. The solids were melted then mixed with 3.0 wt % carbon dioxide and 2.1 wt % ethanol. The mixture was then cooled to a temperature of 122° F., for foaming to occur and foamed through a die opening of 27 cm wide and 0.6 mm high. The resulting foam had a density of 2.45 #/cuft, an average cell size of 0.245 mm, a thickness of 1.55 in and a width of 34.5 in. The difference of the foaming temperature and the glass transition temperature of the mixture of polymer and blowing agents in this case was 65.3° C. The resulting foam structure did collapse.

As is apparent from the above description and examples, the process of the present invention for preparing foamed polystyrene bodies such as boards and billets utilizing foamable mixtures with suitable glass transition temperature and foaming at suitable temperatures, results in foamed bodies having acceptable and, in some instances, improved characteristics when the foamable mixture is extruded into a region of lower pressure.

While not wishing to be to bound by any theory, it is believed that resultant foam products having improved properties are obtained when foamable mixtures having suitable glass transition temperatures are used in conjunction with foaming at specific temperatures. This relationship is monitored and embodied in $\Delta T_g$ described herein.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. Process for preparing a foam product comprising the steps of
   (A) forming a foamable mixture of (1) an alkenyl aromatic polymer and (2) a blowing agent comprising a major amount of carbon dioxide under a pressure sufficient to prevent prefoaming of the mixture and
   (B) foaming the mixture into a region of reduced pressure to form the foam product, wherein the difference between the glass transition temperature of the foamable mixture and the foaming temperature is less than about 62° C.;
   wherein the alkenyl aromatic polymer is selected from the group consisting of (a) a copolymer of styrene and at least one substituted styrene selected from the group consisting of meta-substituted styrene, para-substituted styrene and mixtures thereof, wherein the copolymer is derived from about 5% to about 40% by mole of the substituted styrene, (b) a mixture of (1) a major amount of a polystyrene having a weight average molecular weight of about 45,000 to about 110,000, (2) a minor amount of a polystyrene having a weight average molecular weight of about 190,000 to about 350,000, and (c) mixtures thereof.

2. The process of claim 1 wherein the foaming is done at a temperature below about 125° C.

3. The process of claim 1 wherein the alkenyl aromatic polymer (1) is a copolymer of styrene and at least one meta- or para-substituted styrene.

4. The process of claim 3 wherein the meta- or para-substituent is a alkyl group containing from 1 to 8 carbon atoms.

5. The process of claim 3 wherein the substituted styrene is meta- or para-methylstyrene.

6. The process of claim 1 wherein the alkenyl aromatic polymer is a mixture of (a) a major amount of a styrenic polymer having a high melt index, (b) a minor amount of a low melt index styrenic polymer.

7. The process of claim 6 wherein the styrenic polymers are each independently polystyrene or a copolymer of styrene and a copolymerizable monomer.

8. The process of claim 6 wherein the high melt index styrenic polymer has a melt index from about 10 to about 35 and the low melt index styrenic polymer has a melt index from about 0.5 to about 5.

9. The process of claim 6 wherein the high melt index styrenic polymer has a weight average molecular weight from about 30,000 to about 150,000.

10. The process of claim 6 wherein the low melt index styrenic resin has a weight average molecular weight from about 175,000 to about 500,000.

11. The process of claim 6 wherein the high melt index polystyrene is present in an amount from about 55 to about 95 parts and the low melt index styrenic polymer is present in an amount of about 5 parts to about 45 parts, based on the styrenic polymers.

12. The method of claim 1 wherein the blowing agent is present in an amount from about 2% up to about 15% by weight of the copolymer.

13. The process of claim 1 wherein the blowing agent comprises carbon dioxide and a lower alcohol.

14. The process of claim 1 wherein the foamable mixture further comprises a plasticizer resin having a weight average molecular weight of less than about 20,000.

15. The process of claim 14 wherein the plasticizer resin is a polymer derived from styrene, vinyl toluene or alpha methylstyrene.

16. The process of claim 1 wherein the foamable mixture further comprises an elastomeric rubber.

17. The process of claim 16 wherein the elastomeric rubber is a styrenic rubber.

18. The process of claim 1 wherein the blowing agent is not a halogen containing blowing agent.

19. Process of preparing a foam product comprising the steps of
    (A) forming a foamable mixture of (1) an alkenyl aromatic polymer and (2) a blowing agent comprising a major amount of carbon dioxide under a pressure sufficient to prevent prefoaming of the mixture and
    (B) foaming the mixture into a region of reduced pressure and at a foaming temperature of less than about 125° C. to form the foam product, wherein the difference of glass transition temperature of the foamable mixture and the foaming temperature is less than about 63° C.;
    wherein the alkenyl aromatic polymer is selected from the group consisting of (a) a copolymer of styrene and at least one substituted styrene selected from the group consisting of meta-substituted styrene, para-substituted styrene and mixtures thereof, wherein the copolymer is derived from about 5% to about 40% by mole of the substituted styrene, (b) a mixture of (1) a major amount of a polystyrene having a weight average molecular weight of about 45,000 to about 110,000, (2) a minor amount of a polystyrene having a weight average molecular weight of about 190,000 to about 350,000, and (c) mixtures thereof.

20. The process for claim 19 wherein the alkenyl aromatic polymer is selected from the group consisting of (a) a copolymer of styrene and at least one methylstyrene selected from the group consisting of meta-methylstyrene, para-methylstyrene and mixtures thereof, wherein the copolymer is derived from about 5% to about 40% by mole of the methylstyrene, (b) a mixture of (1) a major amount of a polystyrene having a weight average molecular weight of about 45,000 to about 110,000, (2) a minor amount of a polystyrene having a weight average molecular weight of about 190,000 to about 350,000, and (c) mixtures thereof.

21. The process of claim 19 wherein the blowing agent further comprises a lower alcohol.

22. The process of claim 20 wherein the foamable mixture further comprises a low molecular weight resin derived from styrene, vinyl toluene, alpha methylstyrene, or mixtures thereof.

* * * * *